Patented Aug. 25, 1925.

1,551,075

UNITED STATES PATENT OFFICE.

HEINZ THIENEMANN, OF LEVERKUSEN, NEAR COLOGNE-ON-THE-RHINE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

HIGHLY-ACTIVE CHARCOAL.

No Drawing. Original application filed March 15, 1923, Serial No. 625,424. Divided and this application filed February 17, 1925. Serial No. 9,867.

*To all whom it may concern:*

Be it known that I, HEINZ THIENEMANN, a citizen of Germany, residing at Leverkusen, near Cologne, State of Prussia, Germany, have invented new and useful Improvements in a Highly-Active Charcoal, of which the following is a specification.

I have found that a highly active charcoal distinguished by high resistivity to pressure and disintegration which ensure a minimum of wastage can be obtained, by preparing a homogeneous plastic mass from finely ground brown coal and impregnating materials such as concentrated solutions of inorganic salts or acids which can be easily washed out after calcining, extruding the paste into single thread-like products or the like as for instance through a thread press or into briquettes as for instance through a briquetting machine, and subjecting these firm structures to a calcining process. The charcoal obtained is then washed as usual, dried and sieved. It is noted that one can control to a certain extent the grain size of the charcoal obtained by altering the size of the dies of the press.

As an example, 16 parts by weight of finely ground brown coal are mixed with 16 parts by weight of a 50% phosphoric acid solution in a kneading machine and are then extruded through a thread press using dies of 5 mm. diameter. The mass obtained is put through a rotary furnace and after drying is calcined in a muffle furnace. The pieces of charcoal obtained show a good adsorption capacity and great rigidity.

The drying and calcining of the threads can be combined in one and the same operation by using a rotary gas heated furnace fitted with gas heating. If care is taken that the combustion gases are free from oxygen and that the heating temperature does not exceed 700° there is practically no loss of material due to combustion. In this manner a highly active charcoal of the desired grain size and with high rigidity can be obtained in a continuous operation.

This is a division of Ser. No. 625424 dated March 15, 1923.

I claim:

1. Process for preparing highly active charcoal of great resistivity to pressure and disintegration which comprises preparing a paste from finely ground brown coal and a solution containing an inorganic acid radical, extruding the paste in the form of compact bodies, and drying and calcining the bodies.

2. As a new product a highly active charcoal in the form of grains of high rigidity and absorption capacity substantially identical with that which may be prepared by the hereindescribed process which comprises forming a paste of finely ground brown coal and a solution containing an inorganic acid radical, forming the paste into compact bodies, and drying and calcining the bodies.

In testimony whereof I have hereunto set my hand.

HEINZ THIENEMANN.